US008578476B2

(12) United States Patent
Sama (10) Patent No.: US 8,578,476 B2
(45) Date of Patent: Nov. 5, 2013

(54) SYSTEM AND METHOD FOR RISK ASSESSMENT OF LOGIN TRANSACTIONS THROUGH PASSWORD ANALYSIS

(75) Inventor: Venkata Babji Sama, Bangalore (IN)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/428,210

(22) Filed: Mar. 23, 2012

(65) Prior Publication Data

US 2013/0254875 A1 Sep. 26, 2013

(51) Int. Cl.
*H04L 29/06* (2006.01)
*G06F 7/04* (2006.01)
*G06F 17/30* (2006.01)
*G06F 11/10* (2006.01)
*G06F 12/14* (2006.01)
*G06F 12/16* (2006.01)

(52) U.S. Cl.
USPC ....... 726/19; 726/2; 726/25; 726/26; 713/183

(58) Field of Classification Search
None
See application file for complete search history.

(56) References Cited

U.S. PATENT DOCUMENTS

| | | | |
|---|---|---|---|
| 6,910,135 B1 | 6/2005 | Grainger | |
| 7,373,516 B2 | 5/2008 | Ashok et al. | |
| 7,386,892 B2 | 6/2008 | Gilfix et al. | |
| 7,992,782 B2* | 8/2011 | Papierniak et al. | 235/382 |
| 2005/0114678 A1* | 5/2005 | Bagga et al. | 713/183 |
| 2008/0155651 A1* | 6/2008 | Wasmund | 726/2 |
| 2009/0077645 A1 | 3/2009 | Kottahachchi | |
| 2009/0172788 A1 | 7/2009 | Vedula et al. | |
| 2010/0235918 A1* | 9/2010 | Mizrahi et al. | 726/25 |
| 2011/0087888 A1 | 4/2011 | Rennie | |
| 2011/0126289 A1* | 5/2011 | Yue et al. | 726/26 |
| 2011/0225625 A1 | 9/2011 | Wolfson et al. | |
| 2012/0167225 A1* | 6/2012 | Gomez et al. | 726/26 |

* cited by examiner

*Primary Examiner* — Shih-Hon Chen
(74) *Attorney, Agent, or Firm* — Myers Bigel Sibley & Sajovec, P.A.

(57) ABSTRACT

A system and method is provided for determining a risk associated with a login transaction. A password received during the login attempt and determination is made regarding whether the received password is derived form user information. A risk is determined based on a determination that the received password is derived from the user information.

19 Claims, 3 Drawing Sheets

SYSTEM AND METHOD FOR RISK ASSESSMENT OF LOGIN TRANSACTIONS THROUGH PASSWORD ANALYSIS

TECHNICAL FIELD

The invention relates to the field of evaluating login transactions. More particularly, the invention relates to risk-based analysis for evaluating login transactions.

BACKGROUND

Risk-based authentication for login transactions is a mechanism for detecting and preventing identity fraud. Traditionally, risk assessment during authentication of login transactions involves using contextual information such as the location from where the login attempt is made, the browser or agent being used for the login attempt, the time of day when the login attempt is made, etc. The risk assessment may also use the behavioral patterns of the user such as key stroke analysis. These techniques while useful are not sufficient to reduce or eliminate fraud.

Nowadays, users of social media sites disclose their personal information which is readily available to entities with malicious intent to intrude or launch attacks. Oftentimes user passwords are based on such personal information. Thus, there is a need for a risk-based analysis of login transactions to avoid or eliminate intruder attacks that are based on users information.

These and other drawbacks exist.

SUMMARY

Various systems, computer program products, and methods for determining a risk associated with a login transaction are described herein.

According to various implementations of the invention, the method may include a plurality of operations for determining a risk associated with a login transaction. In some implementations, the operations may include receiving, by a processor, a password associated with a login attempt. The operations may further include retrieving, by the processor, user information associated with the user. The operations may further include determining, by the processor, whether the received password is derived from the user information. The operations may further include determining, by the processor, a risk associated with the login transaction based on a determination that the received password is derived from user information.

BRIEF DESCRIPTION OF THE DRAWINGS

The accompanying drawings, which are incorporated into and constitute a part of this specification, illustrate one or more examples of implementations of the invention and, together with the description, serve to explain various principles and aspects of the invention.

Reference will now be made in detail to various implementations of the invention as illustrated in the accompanying drawings. The same reference indicators will be used throughout the drawings and the following description to refer to the same or like items.

DESCRIPTION OF EXEMPLARY IMPLEMENTATIONS

Figure 1:
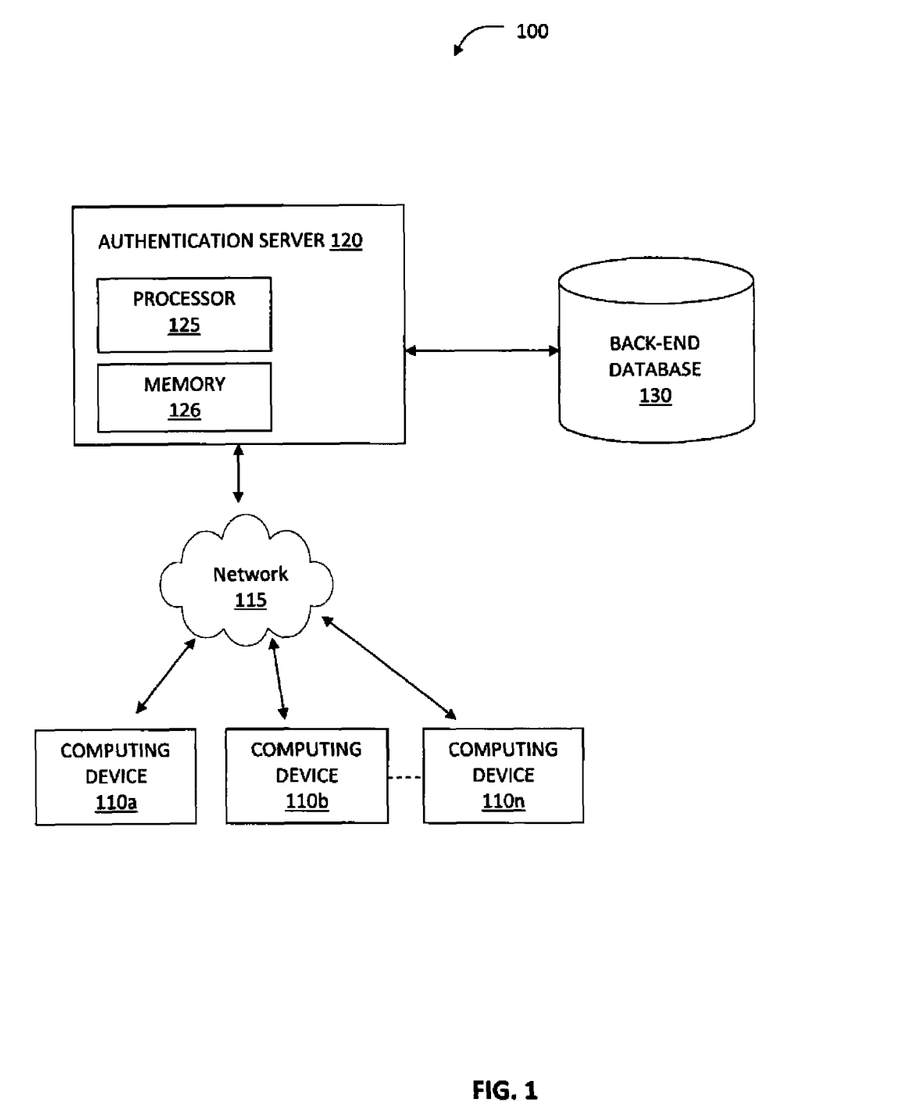
FIG. 1 illustrates an exemplary system for determining a risk associated with a login transaction, according to various aspects of the invention.

FIG. 1 is a block diagram illustrating an authentication system 100 that is configured to determine a risk associated with a login transaction, according to an aspect of the invention. System 100 may include, among other things, an authentication server 120 that is configured to authenticate one or more login transactions. Authentication server 120 may be communicatively coupled to a computing device 110 (illustrated in FIG. 1 as a plurality of computing devices 110a . . . 110n). Authentication server 120 may be coupled to computing device 110 via a network 115. Network 115 may include a Local Area Network, a Wide Area Network, a cellular communications network, a Public Switched Telephone Network, and/or other network or combination of networks.

According to various aspects of the invention, a user may attempt to login to the system 100 via computing device 110 to gain access to one or more resources associated with the system 100. A resource may include, but is not limited to, hardware, software, services, networks, devices, databases, files, and/or any resource requiring a password authentication to access the resource.

System 100 may include a back-end database 130 that is communicatively coupled to authentication server 120. In some implementations, back-end database 130 may store valid passwords for various users of system 100. A valid password can include a password that was provided to the system by the associated user during registration. In other words, during initial registration of the user (during which the user selects a user identifier and a password), the authentication server 120 receives a password provided by the user and stores the user identifier and the password (as the valid password for the user) in back-end database 130. In some implementations, the valid password may be a plain text password. In some implementations, the valid password may be encrypted or hashed by authentication server 120. The encrypted or hashed password may be stored in back-end database 130.

In some implementations, a user may change/modify a number of valid passwords over a period of time. In some implementations, authentication server 120 may generate a history of valid passwords associated with the user over a period of time and store the history of valid passwords in back-end database 130. In some implementations, a password that the user currently uses to gain access to system 100 may be a current valid password for the user. In some implementations, the most recent valid password from the history of the valid passwords in back-end database 130 may be the current valid password for the user.

In some implementations, one or more characteristics associated with the valid password may be stored in back-end database 130. In some implementations, a check digit or partial hash algorithm may be applied to the valid password to obtain a checksum associated with the valid password. In some implementations, authentication server 120 may apply the check digit algorithm and store the checksum in back-end database 130. In some implementations, a Soundex algorithm may be applied to the valid password to obtain a Soundex code associated with the valid password. In some implementations, authentication server 120 may apply the Soundex algorithm and store the Soundex code in back-end database 130. In some implementations, only a hash of the current valid password may be stored in back-end database 130. In some implementations, during a password reset operation, a user may be prompted to provide the current valid password. In this case, the user may provide users' current valid password and a new valid password during the password reset, both of which may be stored in back-end database 130. In some implementations, a plain text of the current valid password (i.e., which is now a previous valid password for the user based on password reset) and a hash of the new password (i.e., which is now the current valid password for the user based on password reset) may be included in the history of valid passwords for the user and may be stored in the back-end database 130

In some implementations, back-end database 130 may store user information. In some implementations, authentication server 120 may receive the user information during user registration and store the received user information in back-end database 130. In some implementations, authentication server 120 may collect user information during one or more authenticated user sessions with system 100. In some implementations, the user information may include users' personal information, users' interests, users' password history/previously used passwords (i.e., passwords that were previously used by the user to login), users' transaction history, and/or other user information. In some implementations, back-end database 130 may store the user identifier, the valid password and the user information.

According to various aspects of the invention, authentication server 120 may receive a login request from the client device 110. The login request may request access to a particular resource associated with system 100. The login request may include a user identifier (for example, user name, email address, or other ID) and password. Authentication server 120 may authenticate the login attempt. In some implementations, authentication server 120 may analyze the user identifier and the received password to determine whether to grant or deny access to the user.

According to various aspects of the invention, authentication server 120 may retrieve user information associated with the user requesting access. In some implementations, authentication server 120 may retrieve the user information based on the user identifier included in the login request. In some implementations, authentication server 120 may receive the user identifier and query back-end database 130 to retrieve the user information associated with the user identified by the user identifier. The lookup may be a structured query language (SQL) query, lightweight directory access protocol (LDAP) query, and/or any other known methods of querying back-end database 130.

According to various aspects of the invention, authentication server 120 may determine whether the received password is derived from the user information. The user information may include a user's personal information such as name, spouse name, address, etc. The user information may include the user's interests such as particular books, characters, movies, sports, and/or other hobbies or interests. The user information may include user's password history/previously used passwords, and/or other user information.

In some implementations, authentication server 120 may determine whether the received password matches or is similar to the user information. In some implementations, authentication server 120 may perform a comparison between the received password and the user information. In some implementations, the user information may include a phrase or a plurality of words (for example, user's address). In some implementations, authentication server 120 may compare the received password with each word associated with the user information.

In some implementations, authentication server 120 may determine that the received password matches the user information based on the comparison. In other words, the received password identically matches at least one word associated with the user information.

In some implementations, authentication server 120 may determine that the received password is similar to the user information based on the comparison. In other words, the received password closely matches but is not identical to at least one word associated with the user information. In some implementations, authentication server 120 may determine how close two strings are to one another, wherein a first string may be associated with the received password and a second string may be associated with at least one word of the user information. In some implementations, authentication server 120 may utilize partial matching techniques, such as, Levenshtein distance, Soundex, Class of words, Meaning of words and/or other partial matching techniques to determine whether the received password is similar to the user information. Other techniques from the fields of Data Mining, Information Retrieval and Natural Language Processing (NLP) may be used as well.

In some implementations, authentication server 120 may determine whether the received password partially matches the user information. For example, strings "BC", "B", "A", or "CB" may each be determined to partially match string "ABC". In some implementations, authentication server 120 may determine that the received password is "similar" to the user information in response to a determination that the received password partially matches the user information.

In some implementations, authentication server 120 may determine whether the received password is phonetically similar to the user information. For example, strings "DULL", "NULL" and "HULL" may be determined to be phonetically similar to one another. In some implementations, authentication server 120 may determine that the received password is similar to the user information in response to a determination that the received password is phonetically similar to the user information. In some implementations, authentication server 120 may use a phonetic algorithm such as Soundex to determine whether the received password is phonetically similar to the user information.

In some implementations, authentication server 120 may determine whether the received password has the same meaning as the user information. For example, strings "CLOSE" and "NEAR" may be determined to have a similar meaning. In some implementations, authentication server 120 may determine that the received password is similar to the user information in response to a determination that the received password has the similar meaning as the user information.

In some implementations, authentication server 120 may determine whether the received password and the user information are associated with a same class of words. For example, strings "CAR", "SCOOTER", and "BUS" may be determined to be associated with the same class (i.e., vehicles). In some implementations, authentication server 120 may determine that the received password is similar to the user information in response to a determination that the received password and the user information are associated to a same class of words.

In some implementations, authentication server 120 may determine a numeric difference between the received password and the user information. In some implementations, authentication server 120 may apply the Levenshtein distance technique to determine the numeric difference between received password and the user information. In some implementations, authentication server 120 may determine that the received password is similar to the user information in response to a determination that the numeric distance is within a predetermined threshold.

In response to a determination that the received password matches or is similar to the user information (using any one or more of the foregoing similarity descriptions), authentication server 120 may determine that the received password is derived from the user information. In some implementations, authentication server 120 may determine a risk associated with the login transactions based on the determination that the received password is derived from the user information. For example, a risk associated with the login transaction may be considered to be high when the received password is derived form the user information because it is likely that an attacker who has knowledge about the user's information is trying to access the system 100.

In some implementations, in response to a determination that the received password is not derived from the user information, it may be determined that the risk associated with the transaction is low (i.e., lower than when it is determined that the received password is derived from the user information).

In some implementations, the risk may include a risk score indicating a degree of risk associated with the login transaction. For example, the risk score may include a numerical value in the range of 1-10, wherein "1" may indicate a lowest risk score, and number "10" may indicate a highest risk score. The numerical value may translate into a level of risk for the login transaction. For example, values between 0-3 may indicate a first risk level (designated as "NORMAL"), values between 4-6 may indicate a second risk level (designated as "SUSPECT"), and values between 7-10 may indicate a third risk level (designated as "DENY"). The third risk level indicate a high risk level, the second risk level may indicate an intermediate risk level, and the first risk level may indicate a low risk level. In some implementations, the risk level may determine the actions to be performed, as described below. As would be appreciated, the foregoing ranges, values and levels are non-limiting examples; other ranges, values, levels, and designations may be used, without departing from the scope of the disclosure.

In some implementations, authentication server 120 may determine a risk score based on how similar the received password is to the user information. In some implementations, the risk score may include a weighted risk score. In some implementations, different portions of user information may be assigned different weights. For example, user's password history may be assigned a first weight, users' personal information may be assigned a second weight, and users' transaction history may be assigned a third weight. The weights/values of weights may be assigned according to priority of a portion of user information for the password analysis process. For example, users' password history may be assigned a higher weight than user's transaction history. In some implementation, one or more of the partial matching techniques described herein may be used to determine which portion of the user information is the closest match to the received password. A weighted risk score (e.g., weighted average) may be computed based on the assigned weights. As would be appreciated, one or more portions of the user information may be assigned a same weight without departing from the scope of the disclosure.

According to various aspects of the invention, authentication server 120 may retrieve a valid password associated with the user (i.e., most recent or current valid password) from a back-end database 130. In some implementations, authentication server 120 may retrieve the valid password based on the user identifier included in the login request. In some implementations, authentication server 120 may retrieve the encrypted password from the back-end database 130 based on the user identifier included in the login request. In some implementations, authentication server 120 may decrypt the encrypted password retrieved from the back-end database 130. In some implementations, authentication server 120 may retrieve the hashed password from the back-end database based on the user identifier included in the login request. In some implementations, authentication server 120 may receive the user identifier and query back-end database 130 to retrieve the valid password associated with the user identified by the user identifier. The lookup may be a structured query language (SQL) query, lightweight directory access protocol (LDAP) query, and/or any other known methods of querying back-end database 130.

According to various aspects of the invention, authentication server 120 may determine whether the received password (password associated with the login request) matches the retrieved valid password. In some implementations, authentication server 120 may perform the match between the received password and the decrypted valid password. In some implementations, authentication server 120 may perform a hash operation on the received password and perform a match between the hashed received password and the retrieved hashed valid password. In response to an exact match, authentication server 120 may determine that the login request is authentic (i.e., the identity of the user is verified) and may grant the user access to the resource.

According to various aspects of the invention, in response to a determination that the received password does not exactly match the valid password, authentication server 120 may determine whether the received password is derived from the user information. In some implementations, a determination whether there is an exact match between the received password and the valid password is made prior to determining whether the received password is derived from the user information. According to various aspects of the invention, in response to a determination that the received password does not exactly match the valid password, authentication server 120 may determine whether the received password is similar to the retrieved valid password. In some implementation, authentication server 120 may make this determination prior to determining whether the received password is derived from the user information.

In some implementations, authentication server 120 may determine how close two strings are to one another, wherein a first string may be associated with the received password and a second string may be associated with the valid password. In some implementations, authentication server 120 may utilize one or more partial matching techniques to determine whether the received password is similar to the valid password. Other techniques from the fields of Data Mining, Information Retrieval and Natural Language Processing (NLP) may be used as well.

In some implementations, authentication server 120 may determine whether the received password partially matches the valid password. In some implementations, authentication server 120 may determine whether the received password is phonetically similar to the valid password (for example, using Soundex algorithm). In some implementations, authentication server 120 may determine whether the received password has the same meaning as the valid password. In some implementations, authentication server 120 may determine whether the received password and the valid password are associated with a same class of words.

In some implementations, authentication server 120 may determine a numeric difference between the received password and the valid password. In some implementations, authentication server 120 may apply the Levenshtein distance technique to determine the numeric difference between received password and the valid password.

In some implementations, authentication server 120 may determine that the received password is similar to the valid password in response to a determination that the received password partially matches the valid password. In some implementations, authentication server 120 may determine that the received password is similar to the valid password in response to a determination that the received password is phonetically similar to the valid password. In some implementations, authentication server 120 may determine that the received password is similar to the valid password in response to a determination that the received password has the same meaning as the valid password. In some implementations, authentication server 120 may determine that the received password is similar to the valid password in response to a determination that the received password and the valid password are associated to a same class of words.

In some implementations, authentication server 120 may determine that the received password is similar to the valid password in response to a determination that the numeric distance is within a predetermined threshold. For example, if the numeric distance lies within the threshold, the user may have made some typographical errors when entering the received password. In some implementations, the threshold may be a configurable parameter set by a system administrator, for example. In some implementations, a numeric distance indicating a typographical error up to one character may be considered within the threshold (which may indicate a casual mistake). However, a numeric distance indicating a mismatch of more than one character may be considered as exceeding the threshold (which may indicate a deliberate attack)

In some implementations, where a plain text valid password is not available for the comparison such as when the valid password is hashed, one or more characteristics associated with the valid password may be used for the comparison. For example, a soundex phonetic algorithm may be applied to the received password to obtain a soundex code associated with the received password. The previously stored soundex code for the valid password may be retrieved from the back-end database 130. The generated code may be compared to the previously stored code to determine whether the received password matches or is similar to the valid password.

In response to a determination that the received password is not similar to the valid password, authentication server 120 may determine whether the received password is derived from the user information.

In response to a determination that the received password is similar to the valid password, authentication server 120 may determine a risk associated with the login transaction. For example, a risk associated with the login transaction in which a user has made some typographical errors when entering the received password may be considered low. In some implementations, in response to a determination that the received password is similar to the valid password, authentication server 120 may determine whether the received password is derived from the user information.

In response to a determination that the received password is derived from the user information, authentication server 120 may determine a risk associated with the login transaction. For example, a risk associated with a login transaction in which the received password is derived from the user information may be considered high. As such, a risk associated with the login transaction in which a user has made some typographical errors when entering the received password may be considered low as compared to a risk associated with a login transaction in which the received password is derived from the user information.

In some implementations, based on the determined risk, authentication server 120 may determine that one or more actions to be performed. In some implementations, the one or more actions may include, but is not limited to, allowing the user one or more additional login attempts, switching to an additional authentication technique/mode such as, OTP (on-time password), allowing the user at least one additional login attempt after a predetermined time period, requesting additional information from the user for authentication purposes, increasing or decreasing the tolerance for the strike count policy (for locking the user account after a specific number of unsuccessful attempts), locking the user account allowing no further login attempts, and/or performing other actions. In some implementations, authentication server 120 may determine which particular action to take based on the risk score/level of risk. Far example, for a first risk level "NORMAL", a strike count might be incremented by one; for a second risk level "SUSPECT", a strike count might be incremented by two; and for a third risk level "DENY", a user account may be locked immediately. In some implementations, actions to be performed may be based on other risk parameters such as, transaction type, in addition to the risk score/risk level. For example, an action for a transaction involving low amount of data transfer may be different than an action for a transaction involving high amount of data transfer.

Authentication server 120 may include a processor 125, a memory 126, and/or other components that facilitate the functions of authentication server 120. In some implementations, processor 125 includes one or more processors configured to perform various functions of authentication server 120. In some implementations, memory 126 includes one or more tangible (i.e., non-transitory) computer readable media. Memory 126 may include one or more instructions that when executed by processor 125 configure processor 125 to perform functions of authentication server 120. In some implementations, memory 126 may include one or more instructions stored on tangible computer readable media that when executed at a remote device, such as computing device 110, cause the remote device to facilitate interaction with the authentication server, as described herein.

In some implementations, computing device 110 may include a computing/processing device such as a desktop computer, a laptop computer, a network computer, a wireless phone, a personal digital assistant, a tablet computing device, workstation, and/or other computing devices that may be utilized to interact with authentication server 120/system 100. In some implementations, computing device 110 may comprise a user interface (not otherwise illustrated in FIG. 1) that allows users to perform various operations that facilitate interaction with authentication server 120/system 100 including, for example, performing login transactions including making login attempts to access the system, providing information associated with the login transaction and/or requested by the authentication server, and/or performing other operations. Computing device 110 may include a processor (not otherwise illustrated in FIG. 1), circuitry, and/or other hardware operable to execute computer-readable instructions.

In some implementations, authentication server 120 may utilize a two-factor authentication scheme such as certificate based authentication, a secure software credential having smart card like characteristics (e.g., ArcotID), or other schemes. In these schemes, a password input during a login attempt does not travel to the authentication server during authentication for security reasons. However, the technique described herein may still be applied to these schemes by transmitting the password to the authentication server as a post step to authentication failure.

Figure 2:
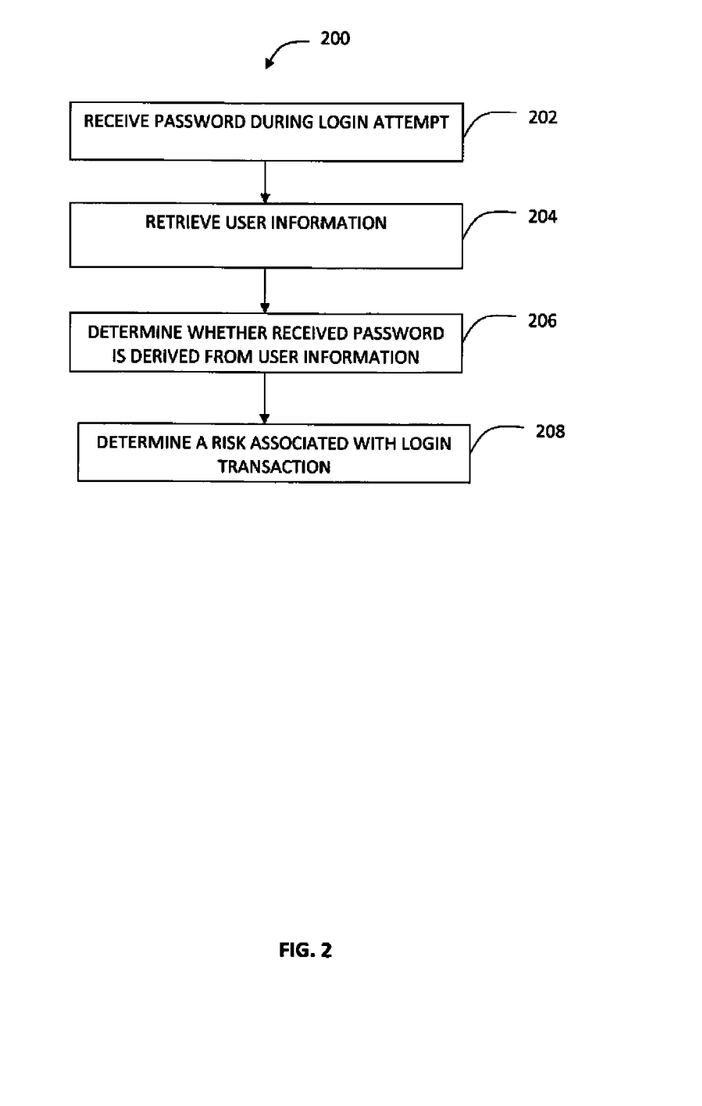
FIG. 2 illustrates a flowchart depicting example operations performed by an authentication system, according to various aspects of the invention.

FIG. 2 is a flowchart 200 depicting example operations performed by authentication server to determine a risk associated with a login transaction, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described in FIG. 2 and other drawing figures are exemplary in nature and, as such, should not be viewed as limiting.

In an operation 202, process 200 may receive a password during a login attempt. In some implementations, process 200 may receive a user identifier and a password associated with a login request.

In an operation 204, process 200 may retrieve user information associated with the user from back-end database 130. In some implementations, process 200 may retrieve the user information based on the user identifier included in the login request.

In an operation 206, process 200 may determine whether the received password is derived from the user information. In some implementations, process 200 may perform one or more comparisons to determine whether the received password is derived from the user information. In some implementations, process 200 may determine whether the received password partially matches the user information. In some implementations, process 200 may determine whether the password is phonetically similar to the user information. In some implementations, process 200 may determine whether the received password has the same meaning as the user information. In some implementations, process 200 may determine whether the received password and the user information are associated with a same class of words. In response to a determination that the received password partially matches, is phonetically similar, has the same meaning, and/or is associated with the same class of words as the user information, process 200 may determine that received password is derived from the user information. On the other hand, process 200 may determine that the received password is not derived from the user information when none of the foregoing similarity comparisons have been sufficiently met.

In an operation 208, process 200 may determine a risk associated with the login transaction. In some implementations, process 200 may determine a risk based on a determination that the received password is derived from the user information. For example, if the received password is derived from the user information, the risk for the login transaction is determined to be high. However, if the received password is not derived from the user information, the risk is determined to be low. In some implementations, process 200 may determine a risk score and/or weighted risk score.

Figure 3:
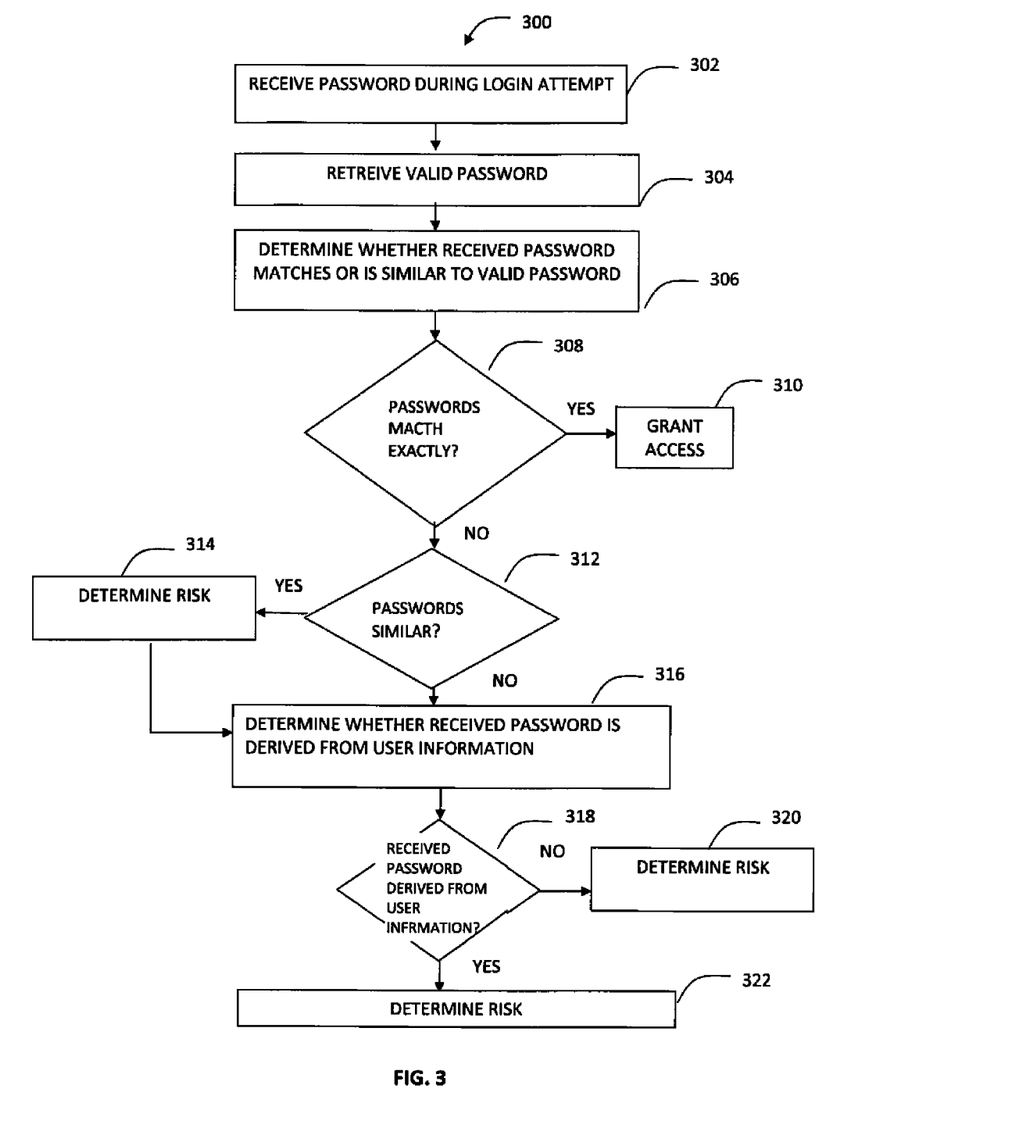
FIG. 3 illustrates a flowchart depicting example operations performed by an authentication system, according to various aspects of the invention.

FIG. 3 is a flowchart 300 depicting example operations performed by authentication server to determine a risk associated with a login transaction, according to various aspects of the invention.

In an operation 302, process 300 may receive a password during a login attempt. In some implementations, authentication server 120 may receive a user identifier and a password associated with a login request.

In an operation 304, process 300 may retrieve a valid password from back-end database 130. In some implementations, process 300 may retrieve the valid password based on the user identifier included in the login request.

In operation 306, 308, and 312, process 300 may determine whether the received password exactly matches or is similar to the valid password. In an operation 310, in response to a determination that the received password exactly matches the valid password, process 300 may grant access. In response to a determination that the received password does not exactly match the valid password, in an operation 312, process 300 may determine whether the received password is similar to the valid password. For example, in an operation 312, process 300 may determine whether the numeric distance between the received password and the valid password is within a predetermined threshold. If the numeric distance does lie within the predetermined, threshold, process 300 may determine that the received password is similar to the valid password. Other similarity comparisons or partial matching techniques may be performed as well.

In response to a determination that the received password is similar to the valid password, process 300 may determine a risk associated with a login transaction in operation 314 and proceed to an operation 316. For example, if the numeric distance lies within the threshold, the user may have made some typographical errors when entering the received password and the risk associated with the login transaction may be considered low. In some implementations, process 300 may determine a risk score indicating a low risk level. For example, a risk score in the range of 0-3 may be determined indicating the risk level as "NORMAL".

In response to a determination that the received password is not similar to the valid password, process 300 may proceed to operation 316.

In operation 316, process 300 may determine whether the received password is derived from user information. In some implementations, user information may be retrieved from back-end database 130 based on the user identifier included in the login request. In response to a determination that the received password is derived from the user information, process 300 may determine a risk associated with the login transaction in operation 322. In some implementations, process 300 may determine a risk score indicating a high risk level. For example, a risk score in the range of 7-10 may be determined indicating the risk level as "DENY". In some implementations, the risk level determined in operation 314 may be elevated to a higher risk level in response to a determination that the received password is derived from user information. In some implementations, in response to a determination that the received password is not derived from the user information, process 300 may determine a risk associated with the login transaction in operation 320. In some implementations, process 300 may determine a risk score indicating an intermediate risk level. For example, a risk score in the range of 4-6 may be determined indicating a risk level as "SUSPECT". In some implementations, the risk level determined in operation 314 may be elevated to a risk level that is higher than the risk level associated with operation 314 but lower than the risk level associated with operation 322.

For example, a user may enter a dog breed name "Doberman" as a password during a login attempt. A valid password may be retrieved which is another dog breed name such as "Bulldog". A determination may be made that Doberman does not exactly match Bulldog. In response to the determination that there is no exact match, a determination may be made whether Doberman is similar to Bulldog. One or more similarity comparisons or partial matching techniques may be performed on the two passwords. For example, a Levenshtein distance algorithm may be applied to determine a numeric distance between the two passwords. The numeric distance (which lies beyond a threshold) may be used to determine that the two passwords are not similar to one another. A Soundex algorithm may be applied to the two passwords to determine a soundex code associated with each password. A different soundex code associated with each password may be used to determine that the two passwords are not similar to one another. Other comparisons may be made as well.

In response to a determination that Doberman and Bulldog are not phonetically or string-compare similar to one another, a determination may be made whether Doberman is derived from user information. User information may indicate an interest in dogs. Based on the user's interest, a determination may be made that the received password "Doberman" is derived from user information. One or more similarity comparisons or partial matching techniques may be performed on the received password and the user's interest information to determine that the received password is derived from the user information. The risk for the login transaction may be determined to be high because it is determined that the received password is derived from the user information (i.e., an attacker who is knowledgeable of user's interests is trying to gain access into the system). In this example, in some implementations, process 300 may also determine that "Doberman" and "Bulldog" belong to a similar class "dogs" and therefore increase the risk associated with the received password.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of determining a risk associated with a login transaction, the method comprising:

receiving, by a processor, a password associated with a login transaction, the login transaction comprising a login attempt by a user to gain access to a resource;

during authentication of the login transaction based on the received password:

a) retrieving, by the processor, a valid password associated with the user;

b) determining, by the processor, whether the received password matches the valid password; and c) in response to a determination that the received password does not match the valid password:

retrieving, by the processor, user information associated with the user;

determining, by the processor, whether the received password is derived from the user information; and determining, by the processor, a risk score associated with the login transaction based on a determination that the received password is derived from the user information, wherein the risk score indicates a degree of risk associated with the login transaction.

2. The method of claim 1, wherein determining whether the received password is derived from the user information further comprises:

determining whether the received password partially matches at least one word associated with the user information.

3. The method of claim 1, wherein determining whether the received password is derived from the user information further comprises:

determining whether the received password is phonetically similar to at least one word associated with the user information.

4. The method of claim 1, wherein determining whether the received password is derived from the user information further comprises further comprises:

determining whether the received password and at least one word associated with the user information are associated with a same class of words.

5. The method of claim 1, determining whether the received password is derived from the user information further comprises:

determining whether the received password and at least one word associated with the user information have a same meaning.

6. The method of claim 1, wherein the user information comprises one or more of users' personal information, users' interests, or users' previously used passwords.

7. The method of claim 1, wherein determining whether the received password is derived from the user information further comprises:

determining whether a numerical distance between the received password and at least one word associated with the user information is within a predetermined threshold.

8. The method of claim 1, further comprising:

in response to a determination that the received password does not match the valid password, determining whether the received password is similar to the valid password; and in response to a determination that the received password is not similar to the valid password, determine whether the received password is derived from the user information.

9. A system of determining a risk associated with a login transaction, the system comprising:

one or more processors configured to:

receive a password associated with a login transaction, the login transaction comprising a login attempt by a user to gain access to a resource;

during authentication of the login transaction based on the received password:

a) retrieve a valid password associated with the user;
b) determine whether the received password matches the valid password; and
c) in response to a determination that the received password does not match the valid password:
retrieve user information associated with the user;
determine whether the received password is derived from the user information; and
determine a risk score associated with the login transaction based on a determination that the received password is derived from the user information, wherein the risk score indicates a degree of risk associated with the login transaction.

10. The system of claim 9, wherein the one or more processors configured to determine whether the received password is derived from the user information are further configured to:
determine whether the received password partially matches at least one word associated with the user information.

11. The system of claim 9, wherein the one or more processors configured to determine whether the received password is derived from the user information are further configured to:
determine whether the received password is phonetically similar to at least one word associated with the user information.

12. The system of claim 9, wherein the one or more processors configured to determine whether the received password is derived from the user information are further configured to:
determine whether the received password and at least one word associated with the user information are associated with a same class of words.

13. The system of claim 9, wherein the one or more processors configured to determine whether the received password is derived from the user information are further configured to:
determine whether the received password and at least one word associated with the user information have a same meaning.

14. The system of claim 9, wherein the user information comprises one or more of users' personal information, users' interests, or users' previously used passwords.

15. A tangible computer-readable storage medium having one or more computer-readable instructions thereon which when executed by one or more processors cause the one or more processors to:
receive a password associated with a login transaction, the login transaction comprising a login attempt by a user to gain access to a resource;
during authentication of the login transaction based on the received password:
a) retrieve a valid password associated with the user;
b) determine whether the received password matches the valid password; and
c) in response to a determination that the received password does not match the valid password:
retrieve user information associated with the user;
determine whether the received password is derived from the user information; and
determine a risk score associated with the login transaction based on a determination that the received password is derived from the user information, wherein the risk score indicates a degree of risk associated with the login transaction.

16. The tangible computer-readable storage medium of claim 15, wherein the instructions causing the processors to determine whether the received password is derived from the user information further cause the one processors to:
determine whether the received password partially matches at least one word associated with the user information.

17. The tangible computer-readable storage medium of claim 15, wherein the instructions causing the processors to determine whether the received password is derived from the user information further cause the one processors to:
determine whether the received password is phonetically similar to at least one word associated with the user information.

18. The tangible computer-readable storage medium of claim 15, wherein the instructions causing the processors to determine whether the received password is derived from the user information further cause the one processors to:
determine whether the received password and at least one word associated with the user information are associated with a same class of words.

19. The tangible computer-readable storage medium of claim 15, wherein the instructions causing the processors to determine whether the received password is derived from the user information further cause the one processors to:
determine whether the received password and at least one word associated with the user information have a same meaning.

* * * * *